Jan. 7, 1936.                C. R. DOWNS                2,026,936
            METHOD AND APPARATUS FOR CONDITIONING AIR
                    Filed May 23, 1933            2 Sheets-Sheet 1
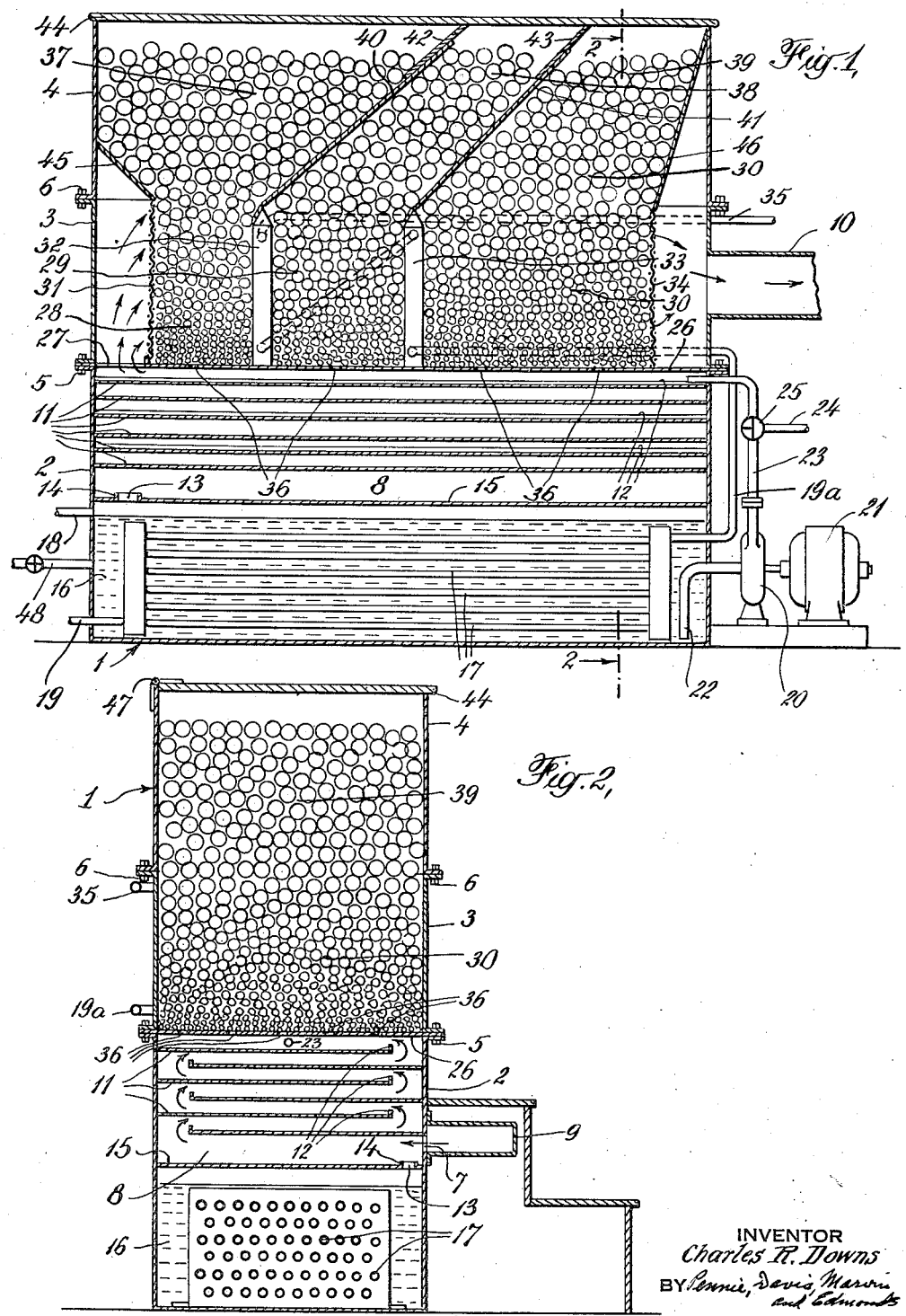
INVENTOR
Charles R. Downs
BY Pennie, Davis, Marvin
    and Edmonds
his ATTORNEYS Jan. 7, 1936.  C. R. DOWNS  2,026,936
METHOD AND APPARATUS FOR CONDITIONING AIR
Filed May 23, 1933  2 Sheets-Sheet 2

INVENTOR
Charles R. Downs
BY
Annie Davis, Marvin H. Edmonds
his ATTORNEYS

Patented Jan. 7, 1936

2,026,936

UNITED STATES PATENT OFFICE 2,026,936

METHOD AND APPARATUS FOR CONDITIONING AIR

Charles R. Downs, Old Greenwich, Conn., assignor to Weiss and Downs, Inc., New York, N. Y., a corporation of New York Application May 23, 1933, Serial No. 672,415

29 Claims. (Cl. 183—4)

This invention relates to improvements in the art of controlling the moisture content of air or gases in enclosed spaces. One object of my invention is to provide an improved method and improved apparatus to reduce the moisture content of air when this is too high to satisfy the requirements of comfort for living beings in enclosed spaces or the requirements of proper manufacture or storage of various materials. The dehumidification of air is generally most essential in warm summer months and for many purposes reduction in the air temperature is not necessary or desirable. According to my invention, the air may be dehumidified without temperature reduction.

Another object of my invention is to provide an apparatus which in addition to performing the above functions will also humidify air when this is required. Such humidification is normally desirable during the cold winter months.

By my process and apparatus, I am able to dehumidify air at a temperature considerably above its dew point. This I accomplish by employing a deliquescent solid and its water solution in a novel manner. Equipment for this purpose, according to my invention, is cheaper to install and operate than when moisture is removed from air by cooling it below its dew point.

Briefly the general method of dehumidification which I employ comprises passing the air through a series of drying zones which include a drying zone, or predrying step, wherein the deliquescent material is in its liquid phase, and a plurality of drying zones wherein the deliquescent material is in its solid phase. The air during its passage through this series of drying zones is cooled in order to remove the heat developed by the absorption of the moisture by the deliquescent material, and the cooling is carried out in a plurality of steps so that the cooling of the air will prevent the temperature of the deliquescent material in the respective drying zones from rising to a point where moisture absorption from the air would be retarded to an impracticable extent.

According to one manner in which this method of air dehumidification may be carried out, the deliquescent solid, preferably calcium chloride, is supported in a plurality of separate masses or beds above a series of trays superposed one above the other in cascade relation. The air to be dried is directed over the surfaces of pools of the drying liquid which are maintained on these trays, and thence into successive contact with the separate masses of the solid drying material and the cooling means associated therewith. The solution is drained from each of the several beds of solid deliquescent material onto the uppermost tray, and after the solution has passed down through the series of trays and becomes diluted to such an extent that it will absorb substantially no further moisture, it is discharged to waste.

I have found by actual practice that upon long continued operation a tough foam blanket tends to form on the surfaces of the unsaturated solutions of calcium chloride comprising the pools. This gradually reduces the efficiency of moisture absorption in the predrying step or zone. Furthermore, and more important, is the fact that dust in being quantitatively removed from the air both by contact with the pools of calcium chloride solution and with the saturated, viscous solutions of calcium chloride on the surfaces of the solid calcium chloride, collects as a sludge in these pools and makes necessary intermittent cleaning.

These objectionable features I have eliminated by artificially causing the calcium chloride solution to be agitated and made to flow through the pools at a rate that will keep them clear of foam blankets and sludge. To accomplish this, I may use a pump, whose function is completely described below, to recirculate the solution in the predrying step. It will be understood that without this recirculation the velocity of flow of the solution through the pools on the respective trays is governed by the rate of moisture absorbed from the air, and consequently is extremely low, amounting to a mere dripping of the solution.

I moreover have found it desirable to cool the recirculated solution before it is discharged to the top tray of the superimposed series of trays since by doing so the top pool is made more viscous and at the same time possesses a lower vapor pressure than the pools below. In this way, in the predrying step the air progressively contacts with solutions of increasing dust and moisture removing properties.

Since I have cooled the air by contact with the cooled recirculated liquid, I may eliminate other air cooling or heat removing means before the first compartment or bed of solid calcium chloride and substitute therefor a retaining screen.

By recirculating a relatively large volume of cooled calcium chloride solution in the predrying step, I form a curtain or cascade of the same as it discharges over the lips of the trays in flowing from tray to tray. This flow of solution may be subdivided into a multiplicity of small streams by suitable means and in so doing, I greatly increase the efficiency of contact between the air to be dried and the calcium chloride solution. This increased contact area is not merely the area of the liquid cascade itself but due to the high speed of air through the apparatus liquid is entrained and is thrown against the vertical walls of the predrying section of the apparatus as well as the lower surfaces of the trays. This more than doubles the wetted surfaces of the apparatus. All of this is accomplished without increasing the resistance to airflow through the apparatus to any appreciable degree which is of great importance from the standpoint of blower capacity.

By using this improvement in the predrying step in combination with the masses of solid calcium chloride in the final drying step or zone, a process of practical utility is presented in that any entrainment of unsaturated solution is separated from the air stream in passing through the mass of solid calcium chloride and prevented from being carried out of the apparatus suspended in the air stream. The very high viscosity of the saturated solution on the surfaces of the calcium chloride masses apparently prevents entrainment as tests made upon the air discharged from the apparatus show no chloride content.

This improvement in process and apparatus for dehumidifying air moreover provides an improved structure and process for humidifying air. In this event, the pump provided for recirculating calcium chloride solution is used to recirculate heated water over the trays en cascade. The cooling means for cooling the recirculated calcium chloride solution during the dehumidification of air then becomes a heating means for heating the recirculated water for the humidification of air. This improvement moreover is more economical as only a very small part of the water fed to the apparatus for humidifying the air is wasted to the sewer, the volume so wasted being only sufficient to keep in solution the salts normally present in water and thereby prevent them from separating out on the surfaces of the heating means. Furthermore, the process and apparatus which I disclose herein is especially suitable for humidifying air in that it automatically heats air after it is humidified to a temperature that is always considerably above that of the air immediately after humidification.

Additional features of my invention will be apparent from a consideration of the accompanying drawings, in which two forms of apparatus for carrying out the invention are illustrated, and from consideration of the following detailed description of the invention in connection with these drawings. It will be understood however that the scope of my invention is defined in the appended claims.

In these drawings:

Fig. 1 is a vertical longitudinal section of one form of air conditioning apparatus of my invention.

Fig. 2 is a transverse vertical section taken along line 2—2 of Fig. 1.

Figure 3:
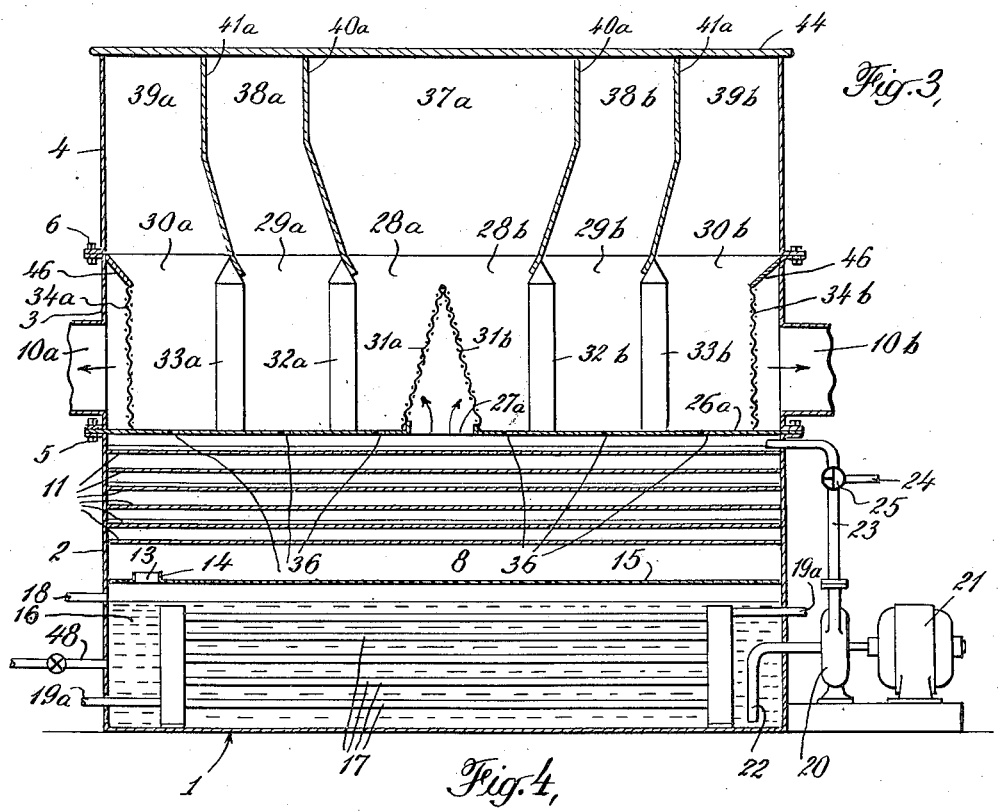
Fig. 3 is a longitudinal vertical section showing a modified form of apparatus.

Referring now to the accompanying drawings, and first to Figs. 1 and 2, the form of apparatus here shown for carrying out the method of my invention comprises a housing 1 forming therein an air treating chamber. This housing is made in three superimposed sections, a predrying or tray section 2, a compartment section 3 and a bin section 4. These sections are made of sheet metal bound at the corners with suitable steel shapes to give stiffness. At the meeting edges of sections 2 and 3 and likewise 3 and 4, they are provided with angle bars having apertures for the reception of bolts 5 and 6 respectively by means of which the sections are secured together.

By making the housing 1 in these sections it may be dismantled and carried through existing doorways even for apparatus of large capacity. Furthermore, this permits the compartment section 3 to be reversed end for end upon the predrying section 2 which may be of advantage in installing the treating chamber in a selected space. Moreover, where variations in calcium chloride storage capacity are desirable, higher or lower bin sections 4 may be bolted to the compartment section 3. The air inlet 7 into the space 8 receives air from an air distributing box 9 which extends horizontally along the wall of section 2. The air outlet from housing 1 is shown at 10.

The liquid holding trays 11 are sealed in any convenient manner to the vertical walls of the section 2 along three edges and alternate trays are spaced from a fourth vertical wall by staggered passages to cause the air to flow in a zigzag fashion back and forth laterally across alternate trays during its progress up through the stack of trays in the direction of the arrows in Fig. 2. The trays 11 are provided at the edges adjacent these air passages with lips 12 to retain a pool of liquid on each tray and to reinforce the edges to prevent sagging. The space 8 below the lowermost tray serves to collect the liquid as it leaves the lowermost tray and also as a space for receiving the incoming air. The floor 15 is sealed to all four walls of section 2 and is provided with a drainage opening 13 through which liquid is discharged from space 8. This opening is surrounded by a lip 14 for maintaining a pool of liquid on the floor 15.

In the installation of the apparatus, the housing 1 should be positioned in such a manner that the liquid holding trays, as well as the floor 15 of the housing, are horizontal. Thus the liquid will be maintained on these trays at a uniform depth and filling of the trays to capacity may be effected. In this manner the absorptive power of the liquid will be utilized to a greater extent and none of the same will be carried to the discharge prematurely.

Drainage opening 13 communicates with a liquid reservoir 16 in which is immersed a heat exchanger or cooler 17 of any suitable construction. An overflow pipe 18 is provided which may be connected with the sewer for discharge of waste liquid from the reservoir 16. The heat transferring coil 17 is provided with an inlet 19 and an outlet 19ª. A pump 20 driven by motor 21 has its suction pipe 22 immersed in the liquid reservoir 16 below the level of the overflow pipe 18 and its discharge pipe 23 is connected through the wall of section 2 above the top tray 11. A branch pipe 24 is provided so that a part or all of the liquid discharged by the pump 20 may be carried from the system by adjusting the three-way cock 25.

When the air has passed over the trays 11 as described above, and reaches the space above the topmost tray its direction of flow is changed from cross-wise flow to lengthwise flow and to do this the compartment section 3 is provided with a bottom plate 26 which completely covers the bottom of section 3 aside from the air passageway 27. The air is caused by this plate to flow towards this air passageway and is discharged into the compartment section 3 through this passageway.

In the compartment section 3 there are provided three compartments 28, 29 and 30 of progressively increasing linear dimensions each to contain a bed or mass of solid calcium chloride when the apparatus is operating as a dehumidifying unit. A screen 31 is provided to support the leading face of the mass of solid calcium chloride resting in the first compartment 28. There are also provided two heat exchangers or air coolers 32 and 33 which also separate the compartments 28, 29 and 30.

The air entering compartment section 3 through passageway 27 passes successively through the screen 31, the solid calcium chloride in compartment 28, the cooler 32, the solid calcium chloride in compartment 29, the cooler 33, the solid calcium chloride in compartment 30 and the screen 34, and leaves the apparatus through the outlet duct 10. The heat exchangers 32 and 33 may conveniently be made of finned tubing. These heat exchangers, when the apparatus is used as a dehumidifying unit, are for the purpose of cooling the air passing through them to remove the latent heat of condensation of moisture removed from the air together with the heat of solution of the calcium chloride to thereby control the temperature of the respective masses of solid calcium chloride in compartments 29 and 30.

The successful and economical reduction of humidity throughout an enclosed space such as a dwelling house depends upon producing a comparatively small quantity of air having as low a relative humidity as possible, in order to avoid the necessity of circulating through the dehumidifying apparatus an unduly large volume of air. In accordance with one of the features of my present invention the production of air having the desired low humidity is aided by maintaining the final bed or mass of deliquescent solid through which the air passes, that is, bed 30, at an average temperature which is lower than the average temperature of the preceding bed, that is, bed 29. In fact it is desirable though not necessary, to maintain the several beds or masses of deliquescent solid 28, 29 and 30 at progressively lower average temperatures. It is moreover desirable to maintain the temperatures of all of the drying zones as low as practicable, and this is especially true of the liquid phase drying zone, since by so doing the liquid discharged to waste through overflow outlet 18 is at maximum dilution, or in other words contains a minimum of the deliquesced solid.

With these considerations in mind, heat exchangers 32 and 33 may be connected in parallel to the source of cooling water or other fluid which is used for cooling them, and the rate of flow of such cooling fluid adjusted to allow the several masses or beds of deliquescent solid to assume during operation of the apparatus the desired relative temperature. It will be understood that thermostatic control of this flow of the cooling fluid may be employed if desired.

Preferably, however, the heat exchangers 32 and 33 are so connected that the cooling water flows through them in series, the water first flowing through heat exchanger 33 and then through 32. This permits efficient utilization of the cooling water and assists in controlling the temperature of the mass of calcium chloride in compartment 30 at a lower point than that in compartment 29. If a larger number of compartments are to be used in series, I prefer connecting the heat exchangers associated with such a series in the above manner so that the cooling water flowing therethrough will aid in producing progressively lower temperatures in the masses of calcium chloride in the consecutive compartments and the effect of this is to approach the minimum possible quantity of moisture in the air before it is discharged from the outlet 10.

The heat exchangers 32 and 33 as above connected may be connected in parallel with the heat exchanger 17 or in series therewith but I prefer to connect these heat exchangers in series as shown in Fig. 1, the cooling water or other fluid flowing first through heat exchanger 17, then through heat exchanger 33, then through heat exchanger 32. It will be understood that the cooling water enters the heat exchanger system by means of pipe 19 and leaves by outlet 35 of heat exchanger 32 from which it is discharged to waste or for further use.

The bottom plate 26 of compartment section 3 forms a collector plate for receiving the concentrated calcium chloride solution which drips from the masses of solid calcium chloride in the compartments 28, 29 and 30 and this plate is provided with small perforations 36 to drain the solution to the body of liquid recirculated by pump 20. These several solutions are each saturated so that a slight reduction in temperature would cause them to resolidify. Such reduction in temperature is avoided, however, since the solutions are drained directly and separately onto the uppermost tray 11. The solutions are thus prevented from coming in contact with the heat exchangers 32 and 33, and by discharging the solutions through the orifices 36 there is no opportunity for cooling to occur.

The solid calcium chloride shown in the compartments 28, 29 and 30 is in lump, briquet or generally spheroidal form and as these fragments liquefy and are reduced in size, the mass settles and contracts in volume. The bins 37, 38 and 39 of bin section 4 serve to automatically replenish the calcium chloride mass in the compartments. The bins are divided from each other within the bin section 4 by the division walls 40 and 41. By slanting these walls I provide storage for fresh calcium chloride lumps in bins 37, 38 and 39 approximating the rate at which the calcium chloride liquefies in the compartments 28, 29 and 30. These division walls 40 and 41 may be in a fixed position or may be attached to the tops of the radiators 32 and 33 by hinges with their upper edges free to be moved longitudinally to vary the ratio of these volumes. For this purpose, sliding plates 42 and 43 are provided so that by adjustment of the top edges of the division walls they may be made to fit snugly against the under side of the cover 44 to prevent air from by-passing the heat exchangers 32 and 33.

Fixed slanting metal sheets 45 and 46 are provided to cause the masses of solid calcium chloride in the bins adjacent thereto to feed into compartments 28 and 30 but it is to be understood that these or similar sheets may be adjustable like the division walls 40 and 41 if desired. The cover 44 may be hinged at 47 or fastened to the top of the section 4 by any suitable means to make a tight fit.

In Figures 1 and 2 the slanting walls of the bins are shown in a slanting position longitudinally of the apparatus. It is to be understood however that they may also be slanted transversely to provide a still greater capacity for a given height.

As the masses in the compartments following the coolers shrink in volume, solid calcium chloride automatically feeds down from the storage bins to keep these compartments full, thereby preventing air from by-passing the masses and at the same time utilizing the maximum efficiency of the heat exchanger surfaces at all times. The bins in themselves are highly advantageous in that they may be made of sufficient size to hold enough solid calcium chloride to last for considerable periods of time thereby permitting infrequent servicing of the apparatus.

Furthermore, the solid calcium chloride contained in a series of compartments liquefies most rapidly in the first compartment and progressively more slowly in the compartments following in the series. By the provision of storage bins, this unequal rate of use is compensated for by constructing the bins with varying volumes to suit the rates at which the calcium chloride is liquefied. For example, under certain circumstances with compartments of equal length, the ratio of the rate of liquefaction of the solid calcium chloride in the compartments where there are three in series may be, for example, 50%, 30% and 20% of the total solid calcium chloride therein. If the compartments are of the same horizontal cross sectional dimensions and the bin walls are vertical and in line with the sides of the compartments, the bin capacities should have relative volumes of 5, 3, and 2 if the bins are to be recharged with calcium chloride over the same time intervals. This makes the first bin in the series unduly high since the amount to be charged into this bin is one half the total.

Moreover, since the heights of cellar ceilings are limited in ordinary houses, the amount of calcium chloride that can be charged at a given time is therefore limited and frequency of charging unduly increased. This difficulty is overcome by slanting the bin walls at suitable angles to adjust the volumes to correspond more exactly with the rate at which the calcium chloride liquefies in the compartments. By this means, the distance to which the calcium chloride has to be lifted during charging is reduced and this constitutes an improvement except in cases where it may be desirable to charge the calcium chloride from an upper floor.

In addition to the above considerations, there is another reason why the compartments should be constructed with progressively increasing length, and the bins made with progressively decreasing capacity. If the calcium chloride in the compartments liquefies at the above rate, for example 5, 3 and 2, and the compartments are all of equal length the compartment spaces are not all being efficiently utilized. For example, if the first compartment, which receives air containing the greatest content of water, is too long, the air passing therethrough becomes heated to such an extent during the removal of moisture in the front portion of the calcium chloride bed that substantially no moisture will be removed in the latter portion. Consequently very little calcium chloride will be liquefied in this latter portion and this represents wasted volume. On the other hand in the second compartment, the air received has a lesser moisture content and neither the bed nor the air in the second compartment will be heated to such an extent as in the first compartment, so that the second compartment remains operative over a greater space, and consequently a smaller portion of the volume of calcium chloride therein is ineffective. The same thing is true of the third compartment. The third compartment has still less moisture to remove and none of the calcium chloride is ineffective. If the compartments are made with lengths of 2, 3 and 5, I still obtain liquefaction rates of 5, 3 and 2 but I obtain a lower exit air relative humidity from the third compartment than when the compartments under the same operating conditions are of equal length.

This increased efficiency in the same total contact length is probably due to the fact that I have eliminated useless bulk of calcium chloride earlier in the series and provided an increased bulk in the last compartment where it is available for a final clean-up of the moisture. I therefore have succeeded in producing a higher rate of moisture removal and a lowered moisture content of the exit air with a given volume of calcium chloride, constituting a great auvantage in process and apparatus. There will then be about 50% of the total calcium chloride liquefied in the first compartment whose volume is only 20% of the total volume of the compartments. The provision of bins of the proper volume gradations above such a series of compartments constitutes a valuable improvement for efficient servicing and operation. It is to be understood that the above ratios are not correct for all conditions of use but are given merely as illustrative of the principle involved.

When the apparatus shown in Figs. 1 and 2 is used for humidifying air, as for example in the winter time, the masses of calcium chloride lumps are removed and the calcium chloride solutions are flushed out of the system and discharged by means of the pump 20 to the sewer. Water is then added to the system to fill the trays 11 and the reservoir 16 up to the overflow 18. Steam or preferably hot water from a heater (not shown) is circulated through radiators 33, 32 and 17 in this order, and the hot water preferably permitted to return to the heater. The humidifying water heated by exchanger 17, is recirculated over the trays 11 by means of pump 20 and humidifies the air passing in contact with this water. The humidified air then passes in series through the heat exchangers 32 and 33 whereby it is always superheated and its relative humidity greatly reduced. This is advantageous in that the air so heated is less likely to condense out free moisture when it emerges from the outlet 10 and mixes with colder air or strikes cold surfaces. Water is added in a small continuous stream to the recirculated humidifying water by means of a pipe 48 connected to the water supply so that at all times there will be a small excess of water overflowing at 18 so that the salts normally present in city water are held in solution and discharged to waste rather than separating out as scale upon the heating surfaces of radiator 17. If the heating water to be passed internally through the radiator 17 is of such a character that a deposit of low heat transferring properties is likely to be formed, an additional radiator entirely outside the housing may be substituted for radiator 17.

When air is humidified by contact with warm water, the air is either saturated with moisture or closely approaches saturation, and may even be supersaturated by the entrainment of droplets in the air stream. When air of this composition is discharged through ducts, condensation and dripping will occur with only a slight drop in temperature, creating a nuisance, or when discharged into a room whose air is of lower temperature, a mist will be formed, or when the moisture laden air stream impinges on cold outside wall surfaces, moisture will be deposited thereon. By providing for a positive increase in temperature of the air after humidification, I prevent these objectionable results.

This humidification and heating of the air I accomplish by circulating the hot water from a steam boiler, or a hot water house heater, or from a water heating coil in a warm air furnace, first through the heat exchangers 33 and 32 and then through the means for heating the recirculated humidifying water, that is heat exchanger 17. In this way the hot water is lowered in temperature during its passage through the heat exchangers 33 and 32, thereby positively preventing the air during the humidifying step from being as hot as the air passing through these heat exchangers. In most installations, I may rely upon the thermal circulation of this hot water but if the stream is too sluggish or the apparatus at an improper level, I may correct this by means of a small circulating pump.

This provision for using hot water makes my apparatus adaptable as an accessory of any common central house heating equipment. For example, it provides for dependable and controllable air humidification even with an oil burning steam boiler wherein steam is generated only when heating is called for by a thermostat. If steam is depended upon for heating humidifying water with such a boiler, it will be heated only when steam is being generated. If the water in such a boiler is used instead, its temperature may be held always above a minimum by an aquastat and the humidifier be supplied with heating water at a desirable temperature at all times.

The use of a pump for recirculating cooled calcium chloride solution in the predrying step while drying air and for recirculating hot water for moistening air constitutes an improvement from another standpoint. Houses are frequently supplied with sewer connections above the cellar floor level and in such cases the apparatus would have to be raised above the sewer connection so that the spent calcium chloride solution or the waste water could be discharged by gravity thereto. By providing a pump for recirculation, I am also able to discharge these liquids to any level necessary for their disposal.

Referring now to Fig. 3 of the accompanying drawings, I show a form of apparatus whose parts are identical with those in Figs. 1 and 2 with the exception of the arrangement of parts in compartment section 3 and bin section 4. The bottom plate 26a of this modified compartment section has its air passageway 27a across the center of its length rather than across the left hand end as shown in Fig. 1. The predried air passes through this passageway and splits into two portions to pass in a right and left hand direction. The air stream to the left passes through a screen 31a and thence in sequence through compartments 28a, 29a, and 30a, the heat exchangers 32a and 33a and the screen 34a to the air outlet 10a. Similarly the air stream to the right passes through screen 31b, then through 28b, 32b, 29b, 33b, 30b and 34b to outlet 10b. The discharged air may be delivered from outlets 10a and 10b to various parts of the space to be conditioned or may be joined together in a single discharge duct outside the apparatus. The bins 37a, 38a and 39a and 38b and 39b may be constructed on a principle similar to the bins in Fig. 1. The rest of the parts of the apparatus are numbered the same as those shown in Figs. 1 and 2 and have the same functions.

Figure 4:
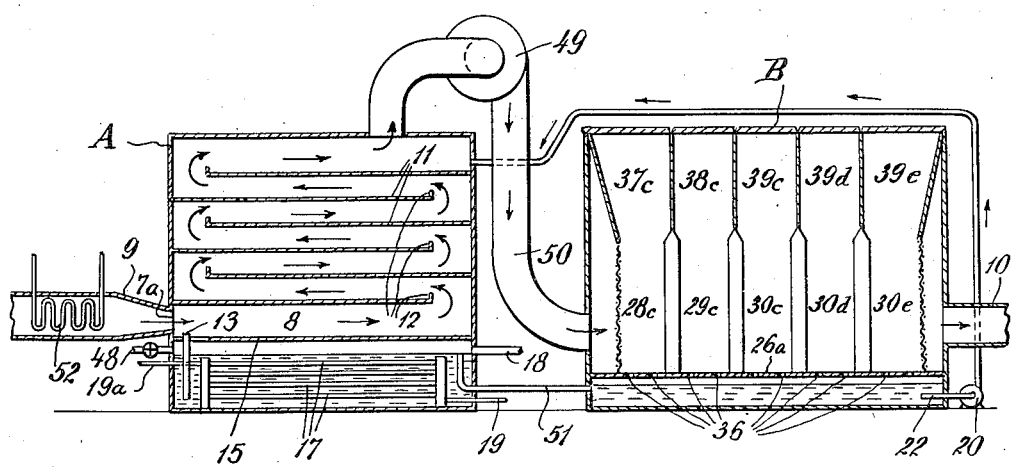
Fig. 4 is a longitudinal vertical section showing another modified form of apparatus.

Referring now to Fig. 4 of the accompanying drawings, I show another form of apparatus whose parts are identical with those in Figs. 1 and 2 except that the section containing the trays is a chamber A separate from the chamber B containing the five compartments 28c, 29c, 30c, 30d and 30e, and bins 37c, 38c, 39c, 39d and 39e. This arrangement has certain advantages especially in the construction of large equipment for treating air for industrial purposes. By this division into two chambers an intermediate fan 49 in series between the chambers may be used to produce the air flow.

In this event the fan 49 draws air from chamber A and discharges it through duct 50 into chamber B as indicated. The pump 20 discharges the circulating liquid to the top tray in chamber A and the liquid after being cooled by the heat exchanger 17 returns by gravity to the bottom of chamber B through pipe 51 where it mixes with the liquid draining from the compartments in chamber B and is again drawn to the pump through pipe 22. By means of liquid recirculation, this type of structure is made operative. I moreover show at 52 a heat exchanger in the inlet duct 9 whereby the air may be heated or cooled before coming into contact with the recirculating liquid in chamber A.

In this form of the invention, the tendency of the calcium chloride to cake and clog in and around the outlets 36 in the bottom of the screen-like support 26a upon which the calcium chloride rests is materially lessened. This tendency of the concentrated material to cool and resolidify in outlets 36 is lessened since the air issuing from the duct 50 is confined to contact with the solid material and does not pass directly above the surface of the solution in the bottom of the chamber B. Also because the concentrated solution which drips through the apertures 36 is dropped into and washed by the dilute solution issuing from the reservoir in the chamber A, there is no opportunity for resolidification due to cooling of the supersaturated solution below the temperature at which it solidifies.

It is to be understood that when the apparatus is operating as a dehumidifier in summer, solid calcium chloride is contained in compartments 28c, 29c, 30c, 30d and 30e and calcium chloride solution is recirculated by pump 20. During this operation it may be advantageous to cool the incoming air below the atmospheric temperature by means of the heat exchanger 52. Moreover, when operating in winter as a humidifier the compartments 28c, 29c, 30c, 30d and 30e are empty and warm water is recirculated by the pump 20. At this period of the year it may be desirable to preheat the incoming air above the atmospheric temperature by means of the heat exchanger 52. This heat exchanger may be heated or cooled by passing therethrough any convenient fluid of the proper temperature to obtain the results desired.

It will be understood that with all these forms of apparatus, automatic control of the conditioned air in the house space may be provided by employing available control accessories such as humidostats, aquastats, and thermostats to actuate various parts of the apparatus. Other variations of the apparatus can be provided to meet the limitations of a specific set of conditions. Control can be manual or automatic in all forms of equipment for both winter and summer. The specific examples described are merely illustrations and I do not intend them to limit the scope of my invention.

By the term calcium chloride, as used in the appended claims, I intend to include either anhydrous calcium chloride or other solid varieties of calcium chloride containing water of crystallization. For general use I prefer solid calcium chloride containing about 25% of water of crystallization.

This application is a continuation in part of my copending application S. N. 629,121 filed August 17, 1932.

I claim—

1. The method of dehumidifying air by the deliquescence of a solid deliquescent material which comprises passing the air through a series of drying zones including a liquid phase drying zone and plurality of solid phase drying zones, cooling the air during its passage through said liquid phase drying zone, cooling the air between each of said solid phase drying zones, and draining the solutions from said respective solid phase drying zones independently of one another.

2. The method of dehumidifying air by the deliquescence of a solid deliquescent material which comprises passing the air through a series of drying zones including a liquid phase drying zone and plurality of solid phase drying zones, removing heat from the air during its passage through said liquid phase drying zone, cooling the air between each of said solid phase drying zones, and draining the solutions from said respective solid phase drying zones independently of one another, and transferring the same to said liquid phase drying zone.

3. The method of dehumidifying a gas which comprises recirculating a solution of a deliquescent solid, cooling said recirculating solution, passing the gas in contact with and counter-current to the flow of said recirculating solution, then passing the gas through a series of beds of said deliquescent solid, cooling the gas between said beds, collecting the solutions draining from said beds and transferring them to the body of said recirculating solution without allowing the solution from any one bed to contact with any other bed.

4. The method of dehumidifying gas which comprises recirculating calcium chloride solution through a series of pools, cooling said recirculating solution, passing the gas in contact with and counter-current to the flow of said recirculating solution, then passing the gas horizontally through a series of beds of solid calcium chloride lumps, cooling the gas between said beds, collecting the solutions draining from said beds and transferring them to the body of said recirculating solution.

5. An apparatus for dehumidifying air by the deliquescence of calcium chloride or the like comprising means for supporting a plurality of separate masses of solid material, a plurality of trays for supporting pools of liquid such material arranged in series, means for directing the air to be dried over the surfaces of said pools and then into successive contact with said separate masses, means for removing heat from the air while it is in contact with said liquid, a heat exchanger positioned in the air stream adjacent each of a plurality of said masses for controlling the temperature of said masses, and means for draining the solution from said masses and transferring the same to said trays without contact with said heat exchangers.

6. An apparatus for dehumidifying air by the deliquescence of calcium chloride or the like comprising means for supporting a plurality of separate masses of solid such material, a plurality of trays for supporting a plurality of pools of liquid such material arranged in series, means for directing the air to be dried over the surfaces of said pools and then into successive contact with said separate masses, means for removing heat from the air while it is in contact with said liquid, a heat exchanger positioned in the air stream adjacent each of a plurality of said masses and controlling the temperature of said masses, said supporting means for said masses being arranged horizontally over the uppermost of said trays, and means for separately discharging the solution from said respective masses onto said uppermost tray.

7. An apparatus for dehumidifying air by the deliquescence of calcium chloride or the like comprising means for supporting a plurality of separate masses of such solid material, a plurality of trays for supporting a plurality of pools of such liquid material arranged in series, means for directing the air to be dried over the surfaces of said pools and then into successive contact with said separate masses, means for removing heat from the air before it traverses each of said masses, and means for draining the solution from said masses and transferring the same to said trays, said supporting means for the separate masses of solid material being of progressively increasing length and serving to support masses of progressively greater length in the direction of air travel through the same.

8. An apparatus for dehumidifying air by the deliquescence of calcium chloride or the like comprising a plurality of compartments arranged side by side to receive solid such material in lump form, means for directing air to be dried horizontally through said compartments in series, means for draining from said compartments the solution which forms on the solid material therein, heat exchangers separating a plurality of said compartments and adapted to cool the air as it enters the compartments, a single storage chamber for the lump material above said compartments, and means for dividing said chamber into hopper sections of varying size depending upon the rate of consumption of solid material in said respective compartments, comprising an adjustable sloping division member extending upwardly from the top of each of said heat exchangers to the top of said storage chamber.

9. An apparatus for dehumidifying air by the deliquescence of calcium chloride or the like comprising a plurality of compartments arranged side by side to receive solid such material in lump form, means for directing air to be dried horizontally through said compartments in series, means for draining from said compartments the solution which forms on the solid material therein, heat exchangers separating a plurality of said compartments and adapted to cool the air as it enters the compartments, a single storage chamber for the lump material above said compartments, and means for dividing said chamber into hopper sections.

10. In an apparatus of the character described, the combination of a chamber containing a plurality of vertically spaced horizontal trays, means for circulating cooled calcium chloride solution in a closed circuit over said vertically spaced horizontal trays, a series of compartments to hold solid calcium chloride, a cooler between each two successive compartments in the series, means for discharging calcium chloride solution from the compartments to the circuit of circulating solution without allowing the solution from any one compartment to contact with the solid calcium chloride in any other compartment, and means for directing the passage of air successively over the trays in said chamber and through the said compartments and coolers.

11. In an apparatus of the character described, the combination of a chamber containing a plurality of vertically spaced horizontal trays, means for circulating calcium chloride solution in a closed circuit in contact with a cooling means, thence to the top tray of said plurality of vertically spaced horizontal trays, thence down in cascade from tray to tray and thence into contact with said cooling means, a series of compartments to contain solid calcium chloride, a cooler between each two successive compartments in the series, means for discharging calcium chloride solution from each compartment to the circuit of circulating solution without allowing the solution from any one compartment to contact with the solid calcium chloride in any other compartment, means for removing excess solution from said closed circuit, and means for directing the passage of air successively over the trays in said chamber countercurrent to the circulating calcium chloride solution and horizontally through the said compartments and coolers.

12. In an apparatus of the character described, the combination of a chamber containing a plurality of vertically spaced horizontal trays, means for circulating calcium chloride solution in a closed circuit in contact with a cooling means, thence to the series of said vertically spaced trays, thence down in cascade from tray to tray and thence into contact with said cooling means, a series of compartments to contain lumps of solid calcium chloride, means for conveying calcium chloride solution from said compartments to the circuit of circulating solution, a cooler between each two successive compartments, a bin arranged above each compartment to keep it full of calcium chloride lumps, and means for directing a current of air successively over the trays in said chamber and horizontally through said compartments and coolers.

13. In an apparatus of the character described, the combination of a chamber containing a plurality of vertically spaced horizontal shelves, a series of compartments above said chamber to contain lumps of solid calcium chloride, means for discharging calcium chloride solution from said compartments to said shelves, a cooler between each two successive compartments, a bin above each compartment arranged to keep it full of calcium chloride lumps, the size of the said bins varying in approximate proportion to the liquefaction occurring in the compartments which they feed and means for directing a current of air successively over the shelves in said chamber counter-current to the flow of said calcium chloride solution and through said series of compartments and coolers.

14. In an apparatus of the character described, the combination of a chamber containing a plurality of staggered vertically spaced shelves, a series of compartments to contain lumps of solid calcium chloride, each of said compartments in the series being longer than the one immediately preceding it, a cooler between each two successive compartments, a bin above each compartment arranged to keep it full of calcium chloride lumps as liquefaction proceeds, the size of said bins decreasing so as to vary in approximate proportion to the liquefaction occurring in the compartments which they feed, means for discharging calcium chloride solutions from said compartments to said shelves, and means for directing a current of air successively over the shelves in said chamber counter-current to the flow of said solution and through said series of compartments and coolers.

15. In an apparatus of the character described, an enclosure with inlet and outlet for confining a stream of air, a series of compartments within said enclosure for supporting lumps of solid calcium chloride, each of said compartments in the series being longer than the one immediately preceding it, a cooler between each two successive compartments, and means for forcing air through said enclosure and alternately through the compartments and coolers in series relationship.

16. In an apparatus of the character described, an enclosure with inlet and outlet for confining a stream of air, a series of compartments within said enclosure for supporting lumps of solid calcium chloride, each of said compartments in the series being longer than the one immediately preceding it, a bin above each compartment arranged to keep it full of calcium chloride lumps as liquefaction proceeds, the second of said bins in the series being smaller than the first, a cooler between each two successive compartments, and means for forcing air through said enclosure and alternately through the compartments and coolers in series relationship.

17. The method of dehumidifying air which comprises passing air through a bed of calcium chloride whereby it is partially dehydrated and its temperature is increased, reducing the temperature of the thus partially dehydrated air to a temperature as low as the temperature at which it entered the calcium chloride bed, and passing the thus cooled air through a second calcium chloride bed of materially greater length than said first calcium chloride bed.

18. The method of dehumidifying air which comprises passing the air through a bed of lump calcium chloride whereby part of its moisture is removed and its temperature increased, cooling the thus partially dehumidified air to partially restore its relative humidity without adding moisture thereto, and passing the said cooled air through a second bed of lump calcium chloride to remove further moisture therefrom, while at the same time draining the solutions resulting from the deliquescence of each bed without contact with the other bed or with the drainage from another bed.

19. In an apparatus for dehumidifying air by the deliquescence of calcium chloride, perforated supports arranged in a single horizontal plane, beds of calcium chloride carried thereby, means for maintaining a dilute solution of calcium chloride beneath each of said supports in close proximity thereto for collecting the concentrated solution dripping through said supports from each of said beds, means for continuously circulating said dilute solution beneath each of said beds and in direct contact with the air to be dehumidified, and means for conducting the air through said beds after such direct contact.

20. The method of dehumidifying air which comprises passing partially dehumidified air through lump calcium chloride in the form of a bed, whereby part of its moisture is removed and its temperature increased, maintaining the volume of the bed constant, cooling the thus dehumidified air to partially restore its relative humidity and passing said cooled air through a second similar bed of lump calcium chloride to remove further moisture therefrom and utilizing the solutions resulting from the deliquescence of said beds for the initial partial dehumidification of the air passed to the first bed.

21. The method of dehumidifying a gas which comprises passing a partially dehumidified gas through a cooled bed of deliquescent solid lumps, catching the concentrated solution thereof which drips from the bed in a dilute solution of the deliquescent material which is not in contact with the gas and then circulating the resultant solution in contact with the gas to partially dehumidify it.

22. In an air conditioning apparatus which employs a cooled bed of solid lump deliquescent material through which air is passed for dehumidification thereof, the method of preventing resolidification of the concentrated solution which is formed in and drips from the bottom of said bed which comprises continuously catching the concentrated solution in a dilute solution of the deliquescent material which is not in contact with the gas and circulating the resulting solution in contact with the air to be dehumidified.

23. The method of conditioning air which comprises circulating the air over pools and through cascades of liquid calcium chloride to remove moisture and dust therefrom, circulating all said air through beds of lump calcium chloride to remove moisture and substantially all dust therefrom and liquefy the solid calcium chloride, draining the dust-containing liquefied calcium chloride separately from each bed into a pool of dilute calcium chloride and circulating the liquefied calcium chloride through all of said pools and cascades.

24. The method of claim 23 in which the air is artificially cooled during its circulation through the beds of lump calcium chloride.

25. The method of dehumidifying air which comprises passing all of the air which has been partially dehumidified through a bed of lump calcium chloride whereby a part of its moisture is removed and its temperature increased, cooling the thus dehumidified air to partially restore its relative humidity without adding moisture thereto and passing said cooled air through a second bed of lump calcium chloride to remove further moisture therefrom, draining the solution from one bed without contact with another bed, and utilizing the solutions resulting from the deliquescence of said beds for the initial partial dehumidification of the air passed to the first bed.

26. In apparatus for dehumidifying air by the deliquescence of calcium chloride, the combination of a plurality of compartments containing solid calcium chloride and having separate and independent drains for the solution formed therein by deliquescence, a container for receiving the solution directly from the independent drains, a circulatory system comprising a plurality of trays and means for circulating calcium chloride solution through said container and said circulatory system and means for passing air through said circulatory system in counter current contact with said solution and through said compartments.

27. In apparatus of the character described, the combination of a series of compartments for containing solid calcium chloride said compartments having drains arranged to permit calcium chloride solution formed by deliquescence to flow from each compartment independently, a circulatory system arranged to receive directly from each compartment the solution flowing therefrom and means for passing gas through the circulatory system in counter current relation with the solution and through the compartments.

28. The method of dehumidifying a gas which comprises providing beds of solid calcium chloride of progressively greater length in the direction of the gas flow, passing the gas through said beds, cooling the gas between said beds, draining the liquefied calcium chloride separately from each bed without contact with another bed and maintaining the volume of said beds by automatically replenishing the same with solid calcium chloride as liquefied calcium chloride is drained therefrom.

29. The method of dehumidifying a gas which comprises providing beds of solid calcium chloride, passing the gas through said beds, cooling the gas between said beds, draining the liquefied calcium chloride from said beds and maintaining the volume of said beds by automatically replenishing the same with solid calcium chloride as liquefied calcium chloride is drained therefrom, catching the liquefied calcium chloride and passing the gas in contact therewith prior to its passage through the beds of solid calcium chloride.

CHARLES R. DOWNS.